May 7, 1940.                L. F. CARTER                2,199,850
                        GYROMAGNETIC COMPASS
                      Filed Sept. 25, 1937           2 Sheets-Sheet 1
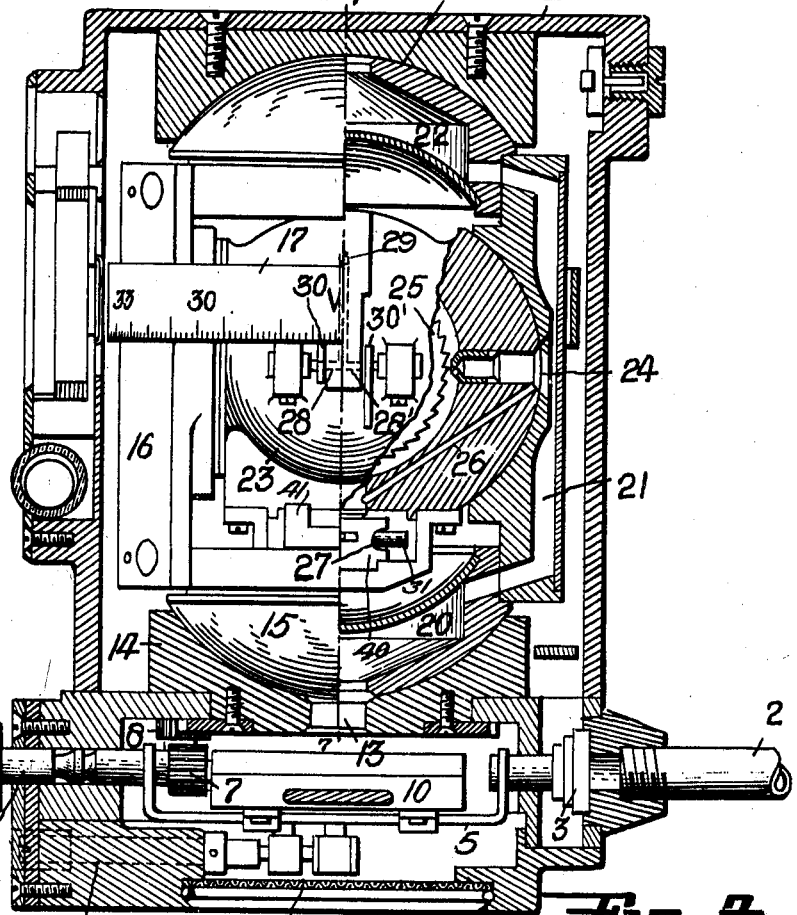
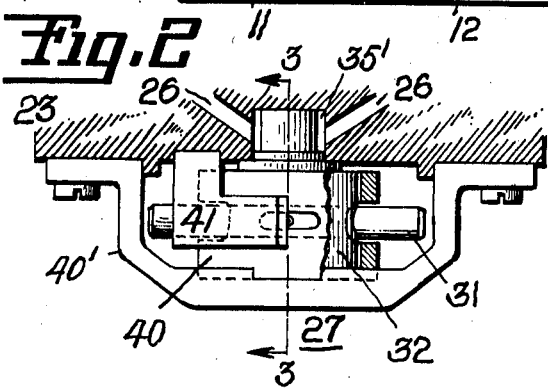
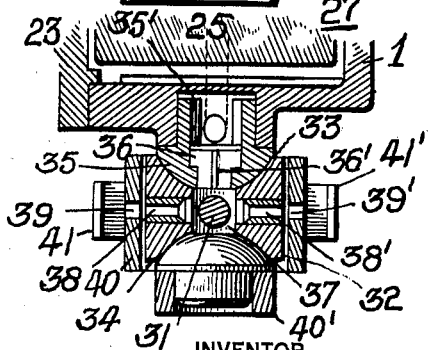
INVENTOR
LESLIE F. CARTER
BY
HIS ATTORNEY.

May 7, 1940.  L. F. CARTER  2,199,850
GYROMAGNETIC COMPASS
Filed Sept. 25, 1937  2 Sheets-Sheet 2
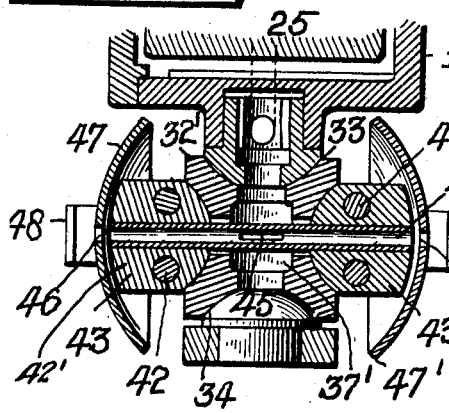
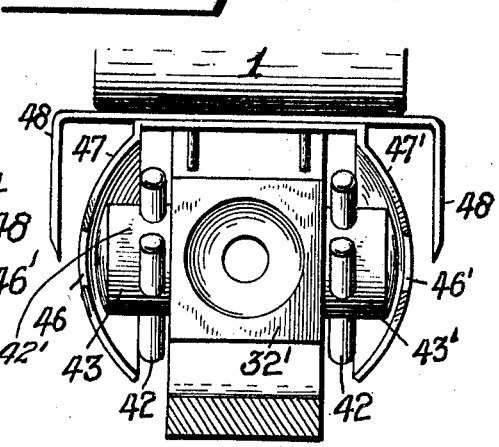
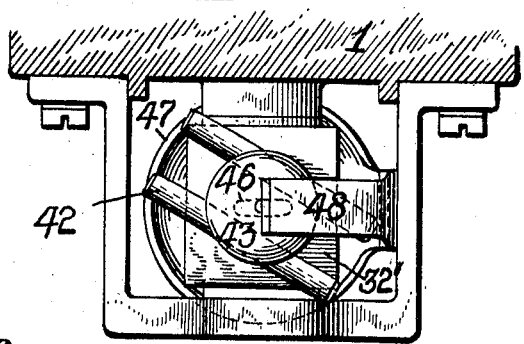
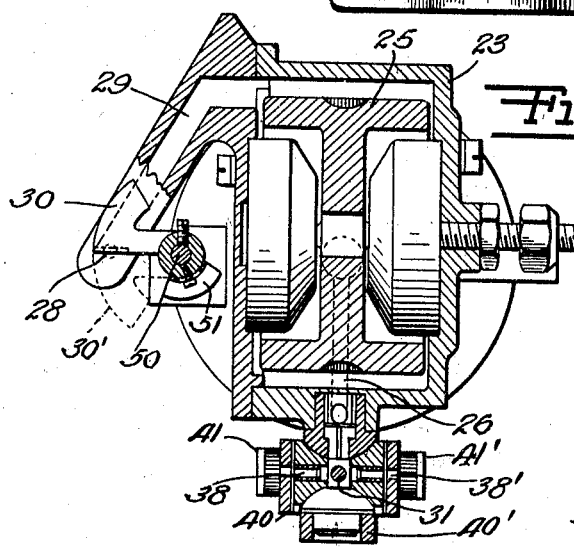
INVENTOR
LESLIE F. CARTER
BY
HIS ATTORNEY Patented May 7, 1940

2,199,850

UNITED STATES PATENT OFFICE 2,199,850

GYROMAGNETIC COMPASS

Leslie F. Carter, Leonia, N. J., assignor to Sperry Gyroscope Company, Inc., Brooklyn, N. Y., a corporation of New York Application September 25, 1937, Serial No. 165,667

15 Claims. (Cl. 33—222)

This invention relates, generally, to a combined gyroscopic and magnetic compass, i. e., a compass utilizing the relative fixity of the gyroscopic compass together with the directional giving properties of the magnetic compass, and the invention has reference, more particularly, to a novel gyromagnetic compass of the type disclosed in my Patent #2,091,964 of September 7, 1937.

One object of the present invention is to provide novel shielding means in association with an air torque system of a sensitive element, such as a magnetic compass element, whereby eddy currents resulting from such operation, such as those caused by deflection from cut-off plates, are prevented from exerting a drag or disturbing torque on the sensitive element.

Another object of the present invention lies in the provision of an improved compass of the above character having means for enabling the compass magnets to turn not only in azimuth but also in elevation to thereby automatically align themselves with the earth's resultant field at all times, whereby the directive force of the compass element is enhanced and maintained at the maximum possible value regardless of the attitude of the craft, the air torque system of the compass element being so constructed and arranged as to be responsive to the movements of the compass in azimuth regardless of the dip of the compass needles.

Another object of the present invention is to provide an extremely accurate and sensitive gyromagnetic compass having a magnetic compass element stabilized about the north-south axis, said compass element being entirely symmetrical, i. e., statically and dynamically balanced about its pivotal axis so as to be unaffected by craft maneuvers which would otherwise cause acceleration forces to act upon this element.

Still another object of the present invention is to provide an improved compass of the above character wherein the directional gyro case and gimbal support, as well as the magnet sensitive element, are air borne on air bearings, thereby eliminating frictional drag that would tend to reduce sensitivity and produce errors.

Other objects and advantages will become apparent from the specification, taken in connection with the accompanying drawings wherein the invention is embodied in concrete form.

In the drawings,

Fig. 1 is a vertical, central, part sectional view taken in the north-south plane of the gyromagnectic compass.

Fig. 2 is an enlarged fragmentary view, partly in section, of the magnetic compass element portion of Fig. 1.

Fig. 3 is a sectional view taken along line 3—3 of Fig. 2.

Fig. 4 is a vertical, central, sectional view in the east-west plane of a somewhat modified form of magnetic compass element, showing the magnets thereof extending horizontally.

Fig. 5 is a plan view of the structure of Fig. 4.

Fig. 6 is a view in side elevation of the structure of Figs. 4 and 5, with one shield omitted and showing the magnets inclined to the vertical as would occur in north and south latitudes.

Fig. 7 is a vertical section through the sensitive element of Fig. 1, taken on center line 7—7.

Similar characters of reference are used in all of the above figures to indicate corresponding parts.

Referring now to Figs. 1 to 3 of the drawings, the gyromagnetic compass of this invention is shown enclosed in an outer casing 1 from which air is continuously exhausted through a pipe 2 during the normal operation of the compass. When it is desired to lock the gyroscope preliminary to resetting or shutting down, a manually operated shut-off valve 3 is employed to cut off communication between the interior of casing 1 and pipe 2. Valve 3 is connected through a yoke 5 and shaft 6 to an operating knob 4 which, when pushed inwardly into the position shown in Fig. 1, serves to disconnect casing 1 from the suction pipe 2 and simultaneously meshes a pinion 7 with the resetting gearing 8 in the manner disclosed in copending application Serial No. 48,008 of Mortimer F. Bates, filed November 2, 1935. Suitable compensating magnet members 10 are positioned over yoke 5 and are set by adjustment of screw shaft 11.

Air is admitted into the bottom of casing 1 through a screened opening 12, whence it flows up through a central opening 13 in concave bearing plate 14, a portion of this air passing between the lower button 15 of the vertical ring 16 and the bearing plate 14 to float the gyroscope sensitive element about a vertical axis. A compass card is shown at 17 secured to the vertical ring. An upper air borne bearing 18 is also provided, to which air is supplied through passages 19, 20, 21 and 22. Air also passes into the rotor bearing case 23 through an opening 24 in the vertical ring 16 at each end of the case 23, a portion of this air serving to spin the directional gyroscope rotor 25 and another portion passing through a passage 26 at each end portion of the case 23 to supply the magnetic compass element 27, as will further appear.

A suitable erecting device is provided for maintaining the gyroscope rotor in a vertical plane, the said device consisting of a pair of oppositely directed air jets issuing from ports 28, 28' provided in a conduit 29 connected to the interior of the gyroscope case, which jets are normally partially intercepted by gravitationally controlled horizontal shutters 30, 30' secured to pivoted stub shaft 50, to which pendulous mass 51 is secured.

The magnetic compass element 27 is mounted at the bottom of case 23 and comprises a horizontal permanent magnet or magnetic needle 31 mounted to extend transversely in an annular member 32 that is floated between upper and lower air bearings 33, 34 for freedom about its vertical axis only. Upper bearing button 35 is vertically apertured and has diametrically opposite cut out openings 35' in its sides for registering with the air supply passages 26. Vertically extending cross vanes 36, 36' provided in the vertical air passage of button 35 serve to eliminate turbulence in the air passing down this passage into a central passage 37 of member 32, across which latter passage the central portion of magnet 31 extends, thereby eliminating any tendency of this air to deflect the compass element. Oppositely directed air ports 38, 38' provided in member 32 and communicating with passage 37, direct opposite air jets which pass through horizontal slots 39, 39' in an annular shield 40 closely surrounding member 32 and are normally equally intercepted by knife edges of baffles 41, 41' mounted on rotor bearing casing 23. The shield 40 is supported by yoke 40' attached to the bottom of rotor case 23 and prevents swirling eddy currents, produced by the air jets striking baffles 41, 41', from contacting with the magnetic sensitive element member 32; thereby eliminating the tendency of these eddy currents to apply a drag or torque tending to deflect or turn the compass element away from the true magnetic north.

In use, the rotor 25 of the directional gyroscope has three degrees of freedom and is erected and stabilized horizontally about the north-south axis by the gravity control 30, 30'. Hence, the gyroscope carried magnetic sensitive element 31, 32, being statically and dynamically balanced and air borne, is not adversely affected by acceleration forces or by the vertical component of the earth's field and so serves to indicate the true magnetic north at all times. As long as the plane of spin of gyroscope rotor also extends along the magnetic north-south axis, the air jets issuing from the magnetic sensitive element are equally intercepted by baffles 41, 41', but should the gyroscope depart from the position of the magnetic needle, the reactive balance of the jets is disturbed and an unbalanced torque is exerted on the gyroscope about its horizontal axis to cause the same to seek the north-south meridian.

Where it is desired that the magnetic sensitive element shall always possess the maximum possibile directive force, the magnet bar or needle may be universally mounted upon the gyroscope as illustrated in Figs. 4 to 6. In these figures, the magnetic compass member 32', floated between the upper and lower air bearings 33, 34 for freedom about its vertical axis, has the frame 42' supporting the magnet bars 42 air floated thereon for freedom about a horizontal axis. Bars or needles 42 are shown carried by said frame 42', which is shown in the form of two buttons 43, 43' air floated on member 32' for turning about a horizontal axis, which buttons are interconnected by a tube 44 extending across the passage 37' of member 32'. The outer surfaces of buttons 43, 43' are of spherical curvature, the center of curvature of which is the point of intersection of the vertical and horizontal axes passing through buttons 33, 34 and 43, 43'. Tube 44 has its wall apertured midway of its length at 45 so that air may be supplied from passage 37' through tube 44 to produce oppositely directed jets issuing from buttons 43, 43'. These jets pass through transverse slots 46, 46' in shield members 47, 47' closely surrounding buttons 43, 43' and are normally equally intercepted by knife edges of baffles 48, 48'. The shield members 47, 47' are of spherical curvature to conform to that of the exterior surfaces of buttons 43, 43' and act to prevent eddy currents, produced by the air jets striking baffles 48, 48', from contacting with the magnetic sensitive element 32', thereby eliminating the tendency of these eddy currents to deflect or turn the compass element away from the magnetic meridian.

Inasmuch as the gyroscopically stabilized magnetic sensitive element 32', 42, 43, 43' is statically and dynamically balanced, and as the magnets 42 are universally mounted, they are free to align themselves with the true earth's field, including the vertical component thereof obtaining in north and south latitudes, so that the sensitive element is thereby given the maximum possible directive force at all times, resulting in a maximum accuracy and sensitivity of the compass.

The operation of the magnetic sensitive element in precessing the directional gyroscope back to the north-south meridian, in event of departure therefrom, is similar to that described in connection with Figs. 1 to 3 and hence would appear to require no further description.

Inasmuch as the tube 44 is positioned on the transverse turning axis of buttons 43, 43', this tube does not move in elevation during turning of the magnet bars 42 in elevation, so that the air torque system is responsive to the azimuthal movements of the compass bars alone, as is necessary for proper operation.

Although the novel shielding means is shown applied to a magnetic compass element, it is to be understood that the same is equally applicable to air torque systems and to air pick-offs from sensitive elements generally.

As many changes could be made in the above construction and many apparently widely different embodiments of this invention could be made without departing from the scope thereof, it is intended that all matters contained in the above description or shown in the accompanying drawings shall be interpreted as illustrative and not in a limiting sense.

What is claimed is:

1. In a device of the character described, a support, a magnetic compass having a compass member air borne by said support for turning about a vertical axis, a compass needle air borne by said member for turning about a horizontal axis, said compass having an air torque jet and intercepting vane system, the reactive torque from which is responsive only to movements of said needle about the vertical axis, and spherically shaped shielding means carried by said support and partially surrounding said compass member for shielding said compass from eddy currents produced by said air torque system.

2. In a gyromagnetic compass, the combination with a gyroscope, a magnetic element turnably mounted thereon, means responsive to the relative turning of said element and gyroscope for applying torques on the gyroscope to cause the same to maintain its normal predetermined position relative to said element, said means including air jets turnable with and issuing from said magnetic element and baffles on said gyroscope intercepting said jets, and shielding means on said gyroscope and extending around said element to prevent air deflected by said baffles from interfering with the freedom of said element.

3. In a gyromagnetic compass, a gyroscope having three degrees of freedom, a magnetic element mounted thereon, and means responsive to the relative turning of said element and gyroscope in azimuth for controlling air jets to apply torques on the gyroscope to cause the same to maintain its normal predetermined position relative to said element, said element comprising a member mounted in air bearings on said gyroscope for turning in azimuth and magnet needles mounted in air bearings on said member for turning in elevation, said element being statically and dynamically balanced about both axes, whereby said needles assume the actual direction of the earth's field.

4. In a gyromagnetic compass, a gyroscope having three degrees of freedom, gravity control means for erecting and stabilizing said gyroscope horizontally, a magnetic element mounted on said gyroscope and having a magnet bar antifrictionally mounted for turning in both azimuth and elevation, air torque exerting means associated with said magnetic element including an air jet issuing therefrom for effecting precession of said gyroscope to correct for wander, said air torque exerting means being unaffected by turning movements of said magnet bar in elevation, and shielding means secured to said gyroscope and partially surrounding said magnetic element to protect the same against drag due to eddy currents from said air torque means, said shield having an aperture therein adjacent said jet to permit uninterrupted passage of air therethrough.

5. As a means for securing control from a sensitive element, a rotatably mounted sensitive element, an air jet thereon, an independently mounted vane or shutter cooperating with said jet, and a shield between said jet and shutter and having an aperture therein opposite said jet for shielding said element from air currents reflected from said shutter.

6. In a gyroscope, an air jet control therefor comprising a controlling element pivoted on the gyroscope about vertical and horizontal axes, oppositely directed air jets issuing therefrom, vanes fixed on said gyroscope and adapted to differentially intercept said jets on relative rotation of said element and gyroscope in azimuth, to apply an unbalanced torque on the latter, and shields between each jet and vane for shielding said element from air jet currents reflected from said shutters, each shield having a slot opposite its respective jets.

7. In a gyromagnetic compass, a three degree of freedom gyroscope, a magnetic compass having a compass member air borne by said gyroscope for turning about a vertical axis, a compass needle air borne by said member for tilting about a horizontal axis, opposed jets issuing along said horizontal axis for exerting a torque on the gyroscope, said jets being therefore unaffected by changes in tilt of said needle.

8. In an air borne magnetic compass, a magnetic needle element having spherically shaped bearing surfaces spaced in the E—W direction, a central stem having complementary bearing surfaces on opposite sides thereof accommodating said bearing surfaces and providing freedom about an E—W axis, said stem also having vertically spaced spherically shaped bearing surfaces a supporting member having cooperating upper and lower surfaces accommodating said last named bearing surfaces and providing freedom about a vertical axis, and means for supplying air flow between each pair of complementary surfaces to provide air bearings.

9. An air borne magnetic compass as claimed in claim 8, wherein a portion of said air emerges along said E—W axis to provide a follow-up or control device from the magnetic element.

10. In a gyromagnetic compass in combination with a gyro rotor bearing casing mounted for freedom about a vertical and horizontal axis, of a magnet, a frame supporting the same, a member supporting said frame, complementary cup and button air bearings between said frame and member pivoting the frame on the member about an axis, complementary cup and button air bearings between said member and the bottom of said casing pivoting the member on the casing about an axis, one of said axes being vertical and the other horizontal and normally lying E—W, and means for providing continuous air flow between each button and its cup.

11. A magnetic compass comprising a magnet, a frame supporting the same, a member supporting said frame, complementary cup and button air bearings between said frame and member pivoting the frame on the member about an axis, a support, and complementary cup and button air bearings between said member and support pivoting the member on the support about an axis, one of said axes being vertical and the other horizontal and normally lying E—W, said magnet and its frame being gravitationally balanced about said horizontal axis, whereby said magnet points toward the magnetic pole both in azimuth and elevation.

12. In an air borne magnetic compass having an air jet pick-off, a support, a magnetic compass element air borne by said support, said compass element having an air torque jet issuing therefrom, a vane or baffle on said support cooperating with said jet, and shielding means on said support extending around said compass element between said jet and vane, said means having a slot therein through which passes said jet for preventing air from said jet from exerting a drag on said compass element.

13. In a device of the character described, a sensitive element, said element having an air jet issuing therefrom, a follow-up support for said element, a vane on said support at least partly intercepting said jet for controlling the movements of said support, and shielding means mounted on said support exterior of said element between said jet and vane substantially surrounding said element and serving to prevent air currents resulting from said jet from disturbing said element.

14. In a device of the character described, a sensitive element having air ports, a follow-up support for said element, baffles on said support disposed opposite said air ports, means for supplying air to said sensitive element air ports for producing opposite air jets for cooperation with said baffles, and spaced shields also on said support and interposed between said air ports and said baffles, said shields being apertured to enable passage of the air jets therethrough.

15. In an air borne magnetic compass, a magnetic needle element having spherically shaped bearing surfaces spaced in the E—W direction, a central stem having complementary bearing surfaces on opposite sides thereof accommodating said bearing surfaces and providing freedom about an E—W axis, said stem also having vertically spaced spherically shaped bearing surfaces, and a supporting member having cooperating upper and lower surfaces accommodating said last named bearing surfaces and providing freedom about a vertical axis, said magnetic needle element being gravitationally balanced about said E—W axis, whereby said magnet points toward the magnetic pole both in azimuth and elevation.

LESLIE F. CARTER.